US011635504B2

(12) United States Patent
Koyama et al.

(10) Patent No.: US 11,635,504 B2
(45) Date of Patent: Apr. 25, 2023

(54) ULTRASONIC SENSOR

(71) Applicant: DENSO CORPORATION, Kariya (JP)

(72) Inventors: Yu Koyama, Kariya (JP); Tetsuya Aoyama, Kariya (JP); Takuya Nomura, Kariya (JP); Satoru Noro, Kariya (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 16/865,003

(22) Filed: May 1, 2020

(65) Prior Publication Data

US 2020/0256968 A1 Aug. 13, 2020

Related U.S. Application Data

(63) Continuation of application No. PCT/JP2018/039895, filed on Oct. 26, 2018.

(30) Foreign Application Priority Data

Nov. 2, 2017 (JP) .............................. JP2017-212696

(51) Int. Cl.
*G01S 7/521* (2006.01)
*B06B 1/06* (2006.01)
(Continued)

(52) U.S. Cl.
CPC ............ *G01S 7/521* (2013.01); *B06B 1/0607* (2013.01); *B06B 1/0662* (2013.01); *G01S 7/523* (2013.01); *G01S 15/02* (2013.01); *G10K 9/122* (2013.01)

(58) Field of Classification Search
CPC .... G11B 5/2655; F04B 15/02; F04B 53/1007; F04B 53/1087; F04B 53/126; F04B 19/22; F04B 53/101; F16K 15/048; F16K 15/04; F16K 15/1823; G10K 9/122; G01S 7/003; G01S 7/521; G01S 7/52; G01S 7/523; G01S 15/02; B06B 1/0662; B06B 1/0607
See application file for complete search history.

(56) References Cited

U.S. PATENT DOCUMENTS

| 4,011,473 A * | 3/1977 | Massa ................... B06B 1/0681 |
| | | 310/335 |
| 7,420,876 B2 * | 9/2008 | Sugiura ................... G01S 15/86 |
| | | 367/87 |

(Continued)

FOREIGN PATENT DOCUMENTS

| CN | 103424181 A | 12/2013 |
| CN | 104105982 A | 10/2014 |

(Continued)

*Primary Examiner* — Daniel L Murphy
*Assistant Examiner* — Amie M Ndure
(74) *Attorney, Agent, or Firm* — Maschoff Brennan

(57) ABSTRACT

An ultrasonic sensor includes: a first electrode that is provided in an ultrasonic microphone including a vibration element having a function of performing conversion between mechanical vibration and an electrical signal; a second electrode that is provided at a position different from the first electrode in an in-plane direction intersecting a directional axis of the ultrasonic microphone; and a detection section that is provided to detect the presence or absence of attached matter attached to the ultrasonic sensor on the basis of a change in capacitance between the first electrode and the second electrode.

13 Claims, 14 Drawing Sheets

(51) Int. Cl.
  *G01S 7/523* (2006.01)
  *G01S 15/02* (2006.01)
  *G10K 9/122* (2006.01)

(56) References Cited

U.S. PATENT DOCUMENTS

| | | | |
|---|---|---|---|
| 2002/0047780 A1* | 4/2002 | Nishimoto | G01S 7/52004 340/601 |
| 2003/0006619 A1* | 1/2003 | Byun | B60R 19/28 293/135 |
| 2007/0144261 A1* | 6/2007 | Okuda | G01N 29/223 73/627 |
| 2007/0157731 A1* | 7/2007 | Okuda | G08G 1/16 73/627 |
| 2008/0165620 A1* | 7/2008 | Sugiura | G01S 17/89 367/99 |
| 2008/0218030 A1* | 9/2008 | Asada | G01S 15/931 310/334 |
| 2009/0196121 A1 | 8/2009 | Wehling et al. | |
| 2019/0079187 A1 | 3/2019 | Tsuji | |

FOREIGN PATENT DOCUMENTS

| | | |
|---|---|---|
| JP | S60-015577 A | 1/1985 |
| JP | S63-033684 A | 2/1988 |
| JP | H05-232241 A | 9/1993 |
| JP | 2000-75052 A | 3/2000 |
| JP | 2007-212349 A | 8/2007 |

* cited by examiner

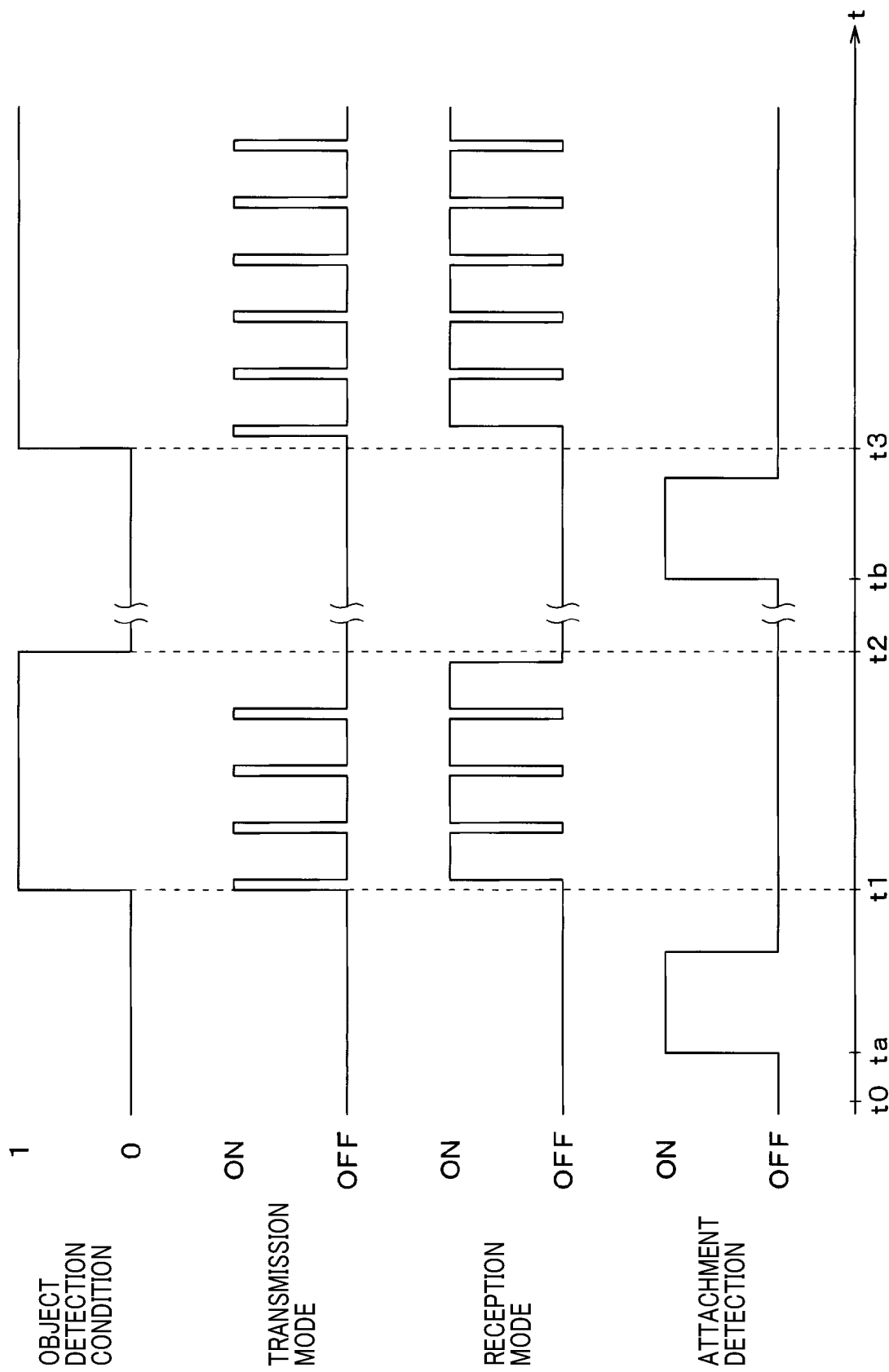

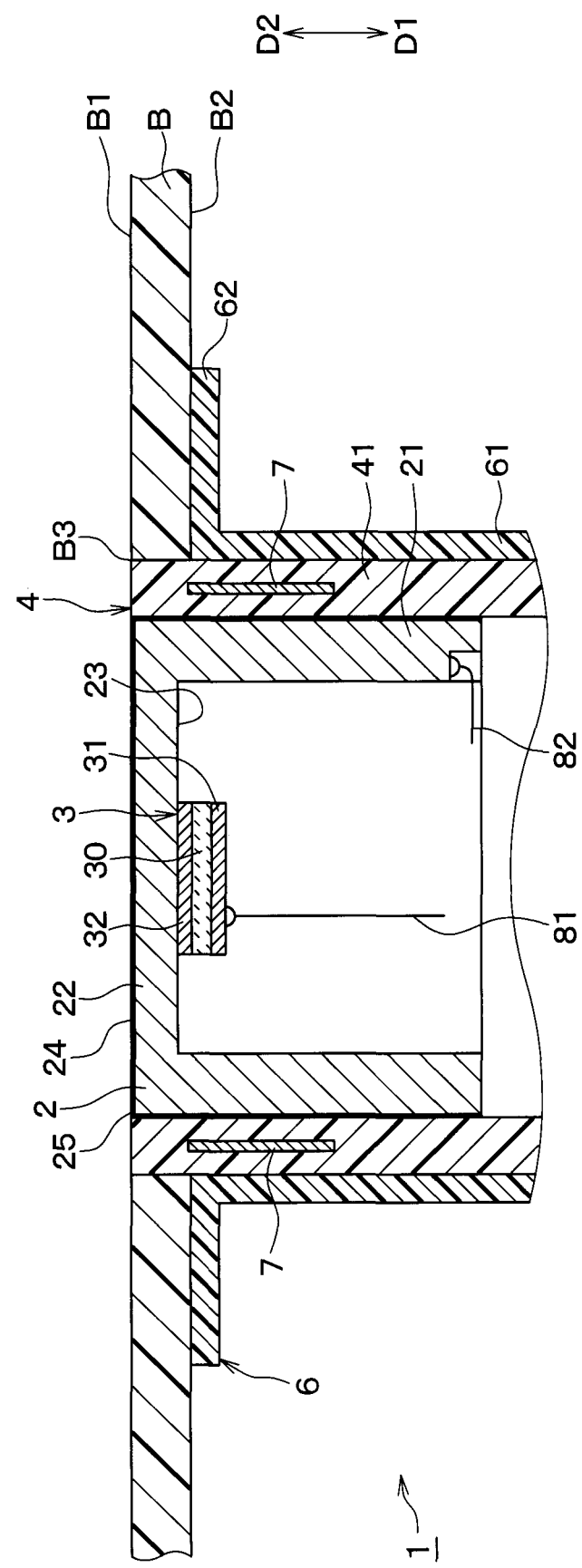

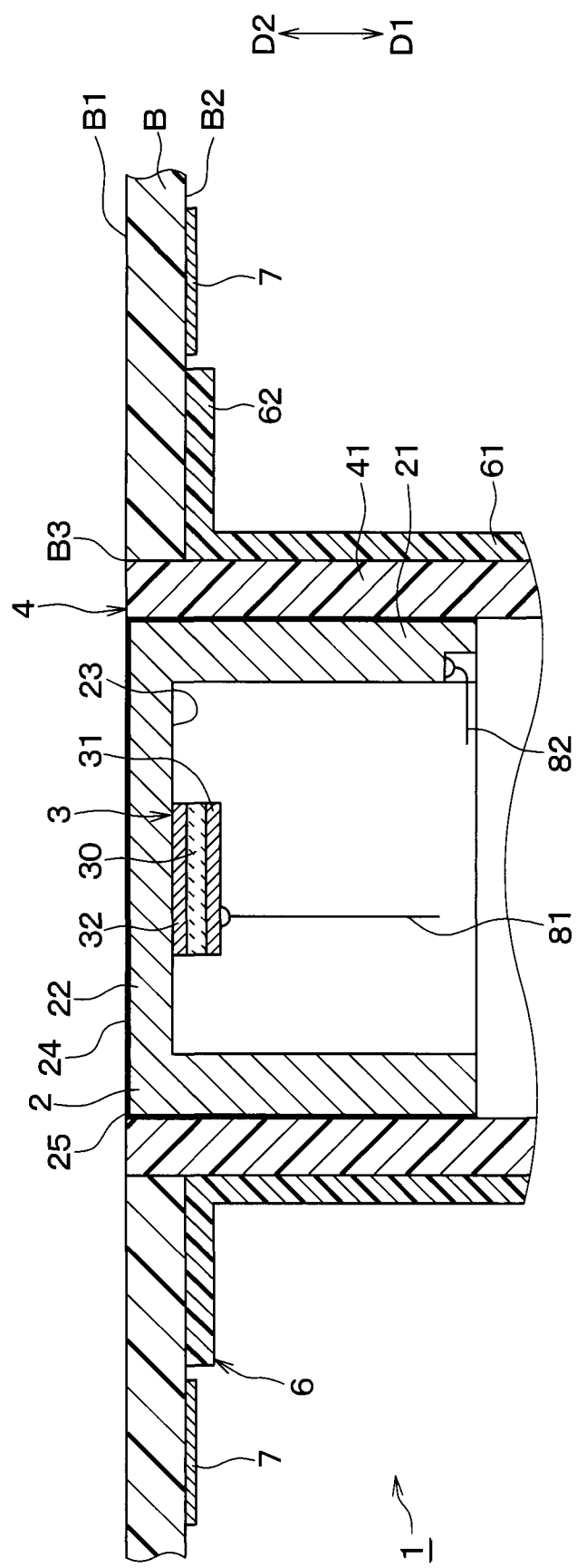

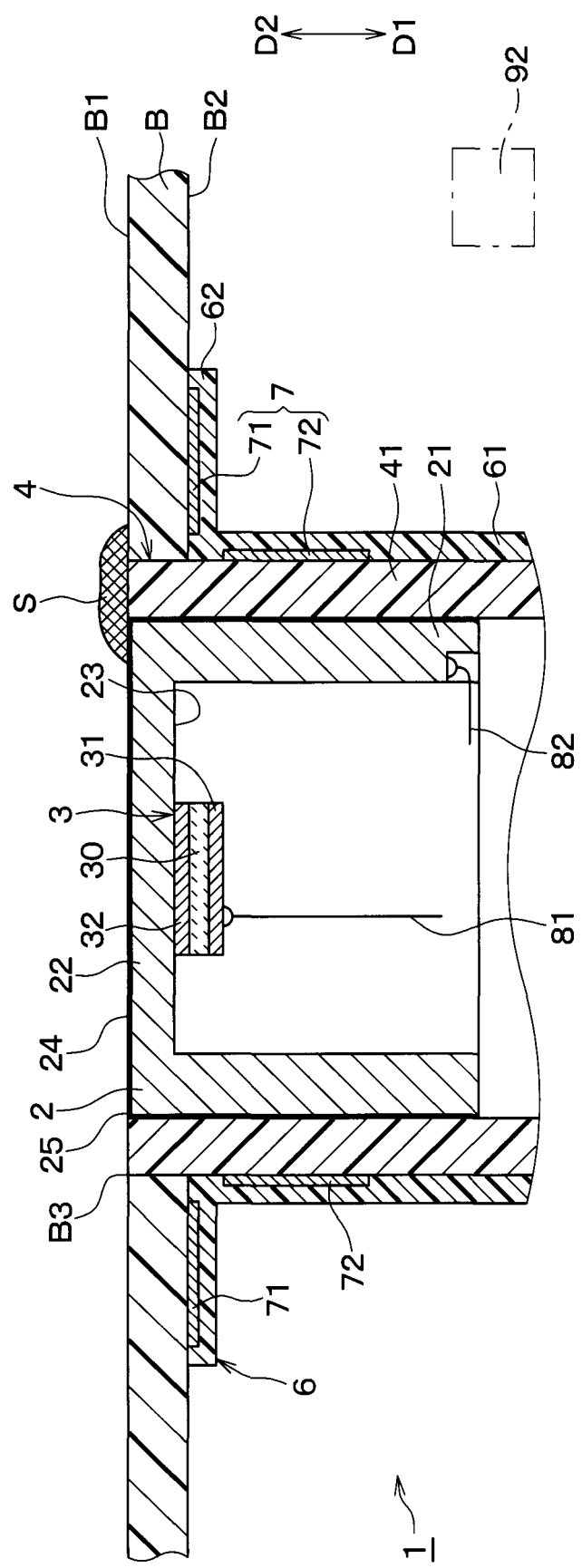

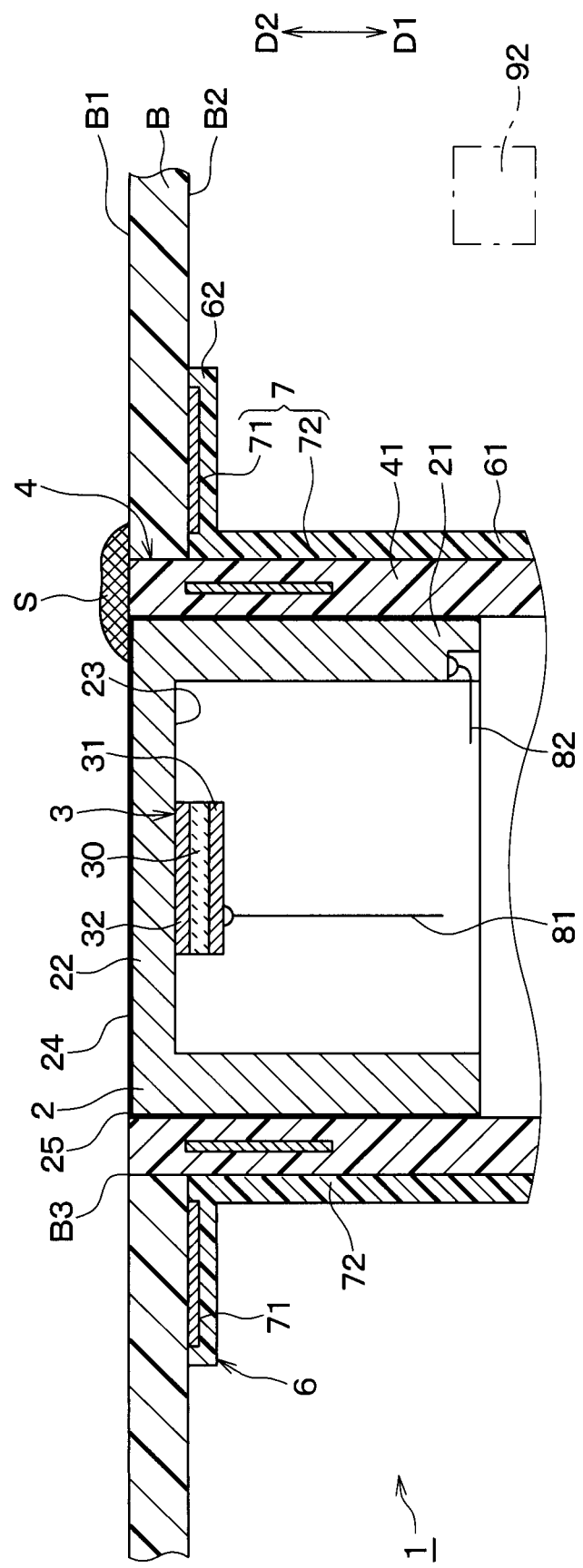

ULTRASONIC SENSOR

CROSS-REFERENCE TO RELATED APPLICATION

This application is based on and claims the benefit of priority from earlier Japanese Patent Application No. 2017-212696 filed on Nov. 2, 2017, the description of which is incorporated herein by reference.

BACKGROUND

Technical Field

The present disclosure relates to an ultrasonic sensor.

Related Art

Ultrasonic sensors that detect an object by transmitting and receiving ultrasonic waves are known. Specifically, this kind of ultrasonic sensor transmits ultrasonic waves by exciting a diaphragm portion using a vibration element such as a piezoelectric element. Furthermore, this kind of ultrasonic sensor detects an object by converting, into an electrical signal, vibration of the diaphragm portion caused when reflected waves of the transmitted ultrasonic waves are received from the object.

SUMMARY

As a first aspect of the embodiment, an ultrasonic sensor is provided which includes: a first electrode that is provided to an ultrasonic microphone including a vibration element having a function of performing conversion between mechanical vibration and an electrical signal; a second electrode that is provided at a position different from the first electrode in an in-plane direction intersecting a directional axis of the ultrasonic microphone; and a detection section that is provided to detect presence or absence of attached matter attached to the ultrasonic sensor on the basis of a change in capacitance between the first electrode and the second electrode.

BRIEF DESCRIPTION OF THE DRAWINGS

In the accompanying drawings:

FIG. 3 is a time chart showing an operation example of the control circuit element shown in FIG. 2;

FIG. 11 is a side cross-sectional view showing a schematic configuration of a modification of a second electrode shown in FIG. 1;

FIG. 12 is a side cross-sectional view showing a schematic configuration of another modification of the second electrode shown in FIG. 1;

FIG. 13 is a side cross-sectional view showing a schematic configuration of sill another modification of the second electrode shown in FIG. 1;

FIG. 14 is a side cross-sectional view showing a schematic configuration of sill another modification of the second electrode shown in FIG. 1;

DETAILED DESCRIPTION OF THE PREFERRED EMBODIMENTS

Ultrasonic sensors that detect an object by transmitting and receiving ultrasonic waves are known. Specifically, this kind of ultrasonic sensor transmits ultrasonic waves by exciting a diaphragm portion using a vibration element such as a piezoelectric element. Furthermore, this kind of ultrasonic sensor detects an object by converting, into an electrical signal, vibration of the diaphragm portion caused when reflected waves of the transmitted ultrasonic waves are received from the object.

This kind of ultrasonic sensor has a problem in which when water, mud, snow, or the like is attached to the diaphragm portion, the transmission and reception of ultrasonic waves are inhibited, and this leads to deterioration in object detection performance. Accordingly, various configurations capable of detecting the attachment of attached matter to the ultrasonic sensor have been conventionally proposed. For example, JP S60-15577 A discloses that attached matter changes an impedance of an ultrasonic vibrator and thus the attached matter can be detected by detecting the change in the impedance.

Ultrasonic sensors are widely used for vehicle driving assistance, for example, vehicle parking assistance and the like. The ultrasonic sensors are expected to be utilized for automatic driving and the like for vehicles. Furthermore, ultrasonic sensors are also expected to be utilized for applications other than vehicles. Specifically, for example, ultrasonic sensors can be utilized for implementation of unattended operation or automation of conveyors provided in factories and the like, agricultural equipment (e.g., cultivators and the like), small aircrafts, and the like.

As described above, the attachment of attached matter to the ultrasonic sensor causes deterioration in detection performance of the ultrasonic sensor. Accordingly, improvement of accuracy in the detection of attached matter attached to the ultrasonic sensor is important in various applications of the ultrasonic sensor. The present disclosure has been made in view of the circumstances exemplified above and the like.

Embodiment

An embodiment will be described below with reference to the drawings. With regard to various modifications applicable to one embodiment, if the modifications are inserted in a series of descriptions regarding the embodiment, understanding of the embodiment may be hindered. Thus, the modifications will be collectively described after the description of the embodiment.

(Configuration)

Figure 1:
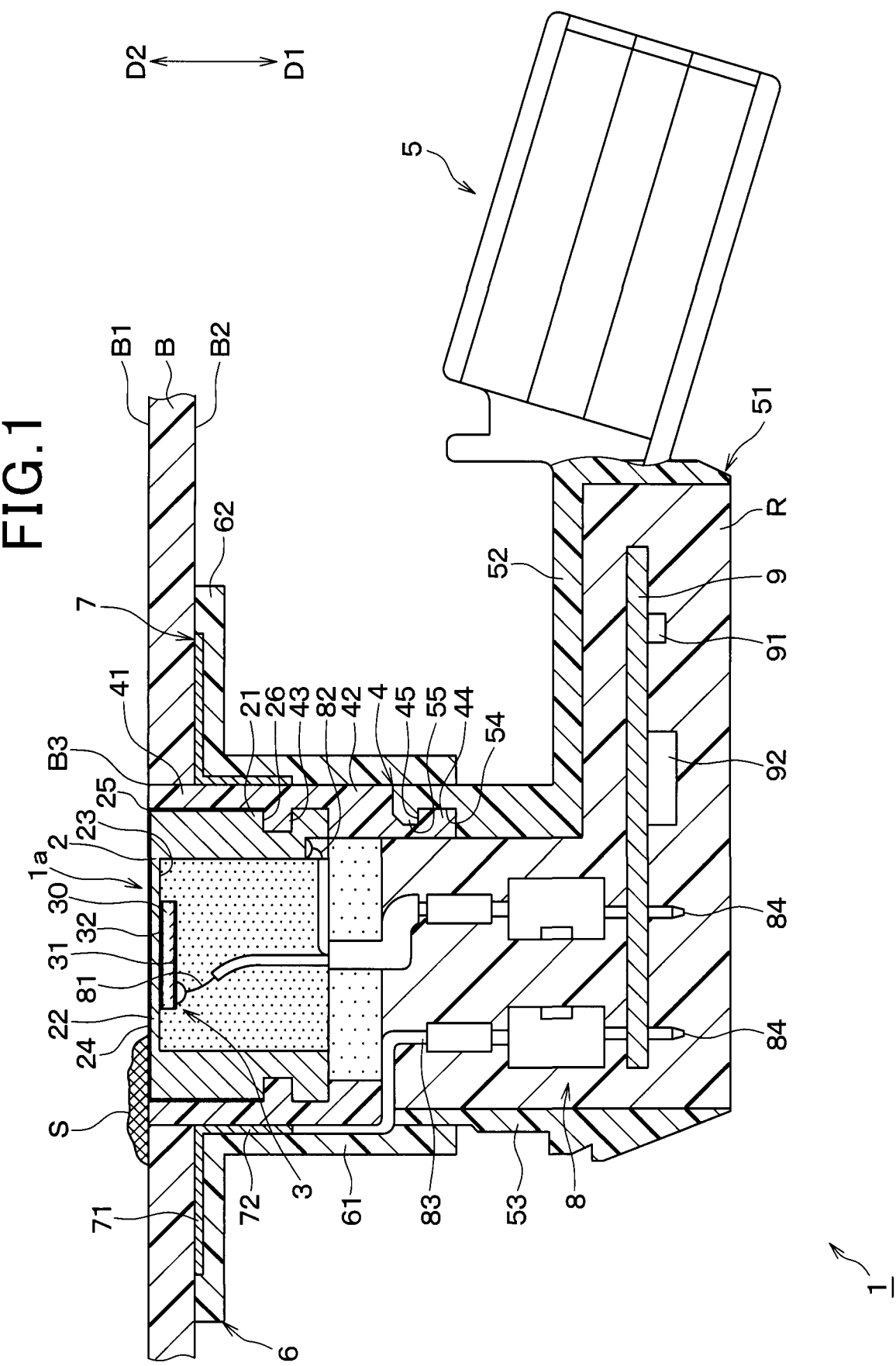
FIG. 1 is a side cross-sectional view showing a schematic configuration of an ultrasonic sensor according to an embodiment.

FIG. 1 shows a schematic configuration when an ultrasonic sensor 1 according to the present embodiment is mounted to a vehicle. In order to simplify the description, a downward direction in FIG. 1 is hereinafter referred to as a "first direction". The first direction is indicated by arrow D1 in FIG. 1. An upward direction in FIG. 1 is referred to as a "second direction". The second direction is a direction opposite to the first direction and is indicated by arrow D2 in FIG. 1. A view of an object in a direction parallel to the first direction is referred to as "plan view". Furthermore, an end portion of a component on the side in the first direction may be referred to as a "base end portion", and an end portion of the component on the side in the second direction may be referred to as a "tip end portion".

With reference to FIG. 1, the ultrasonic sensor 1 according to the present embodiment is configured to be mounted to a vehicle so as to detect an object around the vehicle. Thus, the ultrasonic sensor 1 according to the present embodiment is configured to be mounted to a bumper B, which is a vehicle body component having a plate shape, in a vehicle-mounted state. The "vehicle-mounted state" may also be referred to as a "mounted state" in which the ultrasonic sensor is mounted to the bumper B, which is a body component.

The bumper B has a bumper outer surface B1 that constitutes an outer surface of the vehicle and a bumper inner surface B2 that is a back of the bumper outer surface B1. Furthermore, the bumper B has a mounting hole B3 which is a through hole for mounting the ultrasonic sensor 1 to the bumper B. The mounting hole B3 is formed so as to pass through the bumper B in a vertical direction in FIG. 1.

The ultrasonic sensor 1 includes an ultrasonic microphone 1a. The ultrasonic microphone 1a includes an element support portion 2 and a vibration element 3. The element support portion 2 is configured so as to support the vibration element 3 that has a function of performing conversion between mechanical vibration and an electrical signal. Furthermore, the ultrasonic sensor 1 includes an elastic support member 4, a sensor case 5, a mounting member 6, an outer electrode 7, a wire section 8, and a circuit board 9. A specific configuration of each of these components of the ultrasonic sensor 1 will be described below.

The element support portion 2 has a diaphragm support portion 21 and a diaphragm portion 22. The diaphragm support portion 21 is formed in a substantially cylindrical shape having an axial direction parallel to the first direction. Thus, the ultrasonic sensor 1 is formed in a substantially columnar shape having a center axis parallel to the vertical direction in FIG. 1. In order to simplify the description, the vertical direction in FIG. 1 is hereinafter simply referred to as "axial direction".

A base end portion of the diaphragm support portion 21 has an opening that is opened in the first direction. On the other hand, a tip end portion of the diaphragm support portion 21 is closed by the diaphragm portion 22. That is, the element support portion 2 is formed in a bottomed tubular shape in which one end portion in the axial direction is closed by the diaphragm portion 22. A substantially columnar space is formed inside the element support portion 2. The space is filled with a vibration-proof material such as silicone rubber.

The diaphragm portion 22 is a substantially disk-shaped portion provided so as to close the tip end portion of the diaphragm support portion 21, and is formed so that the diaphragm portion 22 can be vibrated in the axial direction by using, as a fixed end, an outer edge portion of the diaphragm portion 22 in a radial direction. The "radial direction" is a direction orthogonal to the axial direction and a direction radially extending from a center axis of the diaphragm support portion 21. Thus, the diaphragm portion 22 is provided as a diaphragm in which the outer edge portion in the radial direction is supported by the diaphragm support portion 21 so that the diaphragm is vibrated in a mode in which a center portion in the radial direction is moved in the axial direction. The element support portion 2 is provided so that, in the vehicle-mounted state, the diaphragm portion 22 is inserted into the mounting hole B3 and the diaphragm support portion 21 extends from the mounting hole B3 in the first direction.

The diaphragm portion 22 has an inner surface 23 which is a principal surface on the side in the first direction and an outer surface 24 which is a principal surface on the side in the second direction. The "principal surface" is a surface orthogonal to a thickness direction of a plate-shaped member or a plate-shaped portion. Thus, the diaphragm portion 22 is formed as a plate-shaped portion having a thickness direction in the axial direction. The inner surface 23 and the outer surface 24 are provided to be parallel to each other so as to constitute front and back surfaces of the diaphragm portion 22. The inner surface 23 is formed so as to face the substantially columnar space formed inside the element support portion 2. The outer surface 24 is provided with an insulating film 25 including a base coating film for corrosion prevention and a coating film having the same color as the bumper outer surface B1.

An engagement groove 26 is formed on a side surface, i.e., a columnar outer peripheral surface of the diaphragm support portion 21. The engagement groove 26 is a rectangular groove used to support the element support portion 2 on the sensor case 5 via the elastic support member 4. The engagement groove 26 is provided on the entire diaphragm support portion 21 in a circumferential direction. The "circumferential direction" is a circumferential direction of a circle in a virtual plane orthogonal to the axial direction whose center is a point of intersection of the virtual plane and the center axis of the diaphragm support portion 21.

In the present embodiment, the element support portion 2 is formed as a metal member made of aluminum. Thus, the element support portion 2 is formed of aluminum seamlessly in a single piece. Specifically, the diaphragm support portion 21 made of aluminum and the diaphragm portion 22 made of aluminum are seamlessly connected to each other at the outer edge portion of the diaphragm portion 22 in the radial direction and the end portion of the diaphragm support portion 21 on the side in the second direction.

The vibration element 3 is fixedly supported on the diaphragm portion 22 on the inner surface 23 side. In the present embodiment, the vibration element 3 is adhered to the inner surface 23 of the diaphragm portion 22 with a conductive adhesive. In the present embodiment, the vibration element 3 has a configuration as a so-called piezoelectric element. Specifically, the vibration element 3 includes a piezoelectric member 30, a drive electrode 31, and a reference electrode 32.

The piezoelectric member 30 is a plate-shaped or film-shaped member having a thickness direction in the axial direction, and is formed of a piezoelectric material such as piezoelectric ceramics. The drive electrode 31 and the reference electrode 32 are formed of a conductor metal film. The drive electrode 31 is provided on one principal surface of the piezoelectric member 30, i.e., a principal surface on the lower side in FIG. 1. The reference electrode 32 is provided on the other principal surface of the piezoelectric member 30, i.e., the principal surface on the upper side in FIG. 1. Thus, the vibration element 3 is formed by laminating the drive electrode 31, the piezoelectric member 30, and the reference electrode 32 in this order.

The reference electrode 32 is electrically connected to the diaphragm portion 22 so as to have almost the same potential as the diaphragm portion 22. Specifically, in the present embodiment, the reference electrode 32 is connected to the diaphragm portion 22 via the conductive adhesive. Thus, the reference electrode 32 is grounded by being electrically connected via the conductive adhesive to the diaphragm portion 22 constituting a part of the element support portion 2 that is grounded. Accordingly, the element support portion 2 that is provided in the ultrasonic microphone 1a and constitutes a first electrode is electrically connected to the reference electrode 32 which is an electrode layer that constitutes the vibration element 3 and that is fixedly supported on the diaphragm portion 22.

The vibration element 3 is configured such that according to a voltage between the drive electrode 31 and the reference electrode 32, i.e., the diaphragm portion 22, the piezoelectric member 30 is deformed to deform the diaphragm portion 22 in the axial direction and that when stress in the axial direction applied to the diaphragm portion 22 is transmitted to the vibration element 3, a voltage according to the stress is generated between the drive electrode 31 and the reference electrode 32, i.e., the diaphragm portion 22. Furthermore, the ultrasonic microphone 1a is configured to have a directional axis parallel to the axial direction.

Thus, the drive electrode 31 and the reference electrode 32, which are a pair of electrodes of the vibration element 3, are provided so that when a drive signal is applied, the piezoelectric member 30 is ultrasonically vibrated. The drive signal is an electrical signal for driving the vibration element 3, and is specifically a sinusoidal voltage signal obtained by boosting a rectangular voltage signal using a transformer, i.e., a booster. Furthermore, the drive electrode 31 and the reference electrode 32 are provided so as to output an output signal, which is a voltage signal generated in the vibration element 3 by vibration of the diaphragm portion 22. Thus, in the present embodiment, the ultrasonic sensor 1 has a configuration having both functions of transmitting and receiving ultrasonic waves.

The elastic support member 4 that elastically supports the element support portion 2 is provided so as to prevent transmission of vibration between the element support portion 2 and the bumper B and transmission of vibration between the element support portion 2 and the sensor case 5. Specifically, the elastic support member 4 is a substantially cylindrical member that has rubber elasticity and is non-conductive, and is formed of silicone rubber or the like seamlessly in a single piece. The elastic support member 4 is formed so as to have a center axis in the axial direction.

The elastic support member 4 has a support tubular portion 41 and a base portion 42. The support tubular portion 41 is a portion of the elastic support member 4 on the tip end side, i.e., on the side in the second direction, and is configured to elastically support the element support portion 2 while housing the element support portion 2. The base portion 42 is a portion of the elastic support member 4 on the base end side, i.e., on the side in the first direction, and is fixed to the sensor case 5.

In the vehicle-mounted state, a tip end portion of the support tubular portion 41 is inserted into the mounting hole B3 and sandwiched between an inner peripheral surface of the mounting hole B3 of the bumper B and a side surface of the element support portion 2. A base end portion of an inner peripheral surface of the support tubular portion 41 has an engagement protrusion 43 that protrudes inward in the radial direction. The engagement protrusion 43 is formed so as to be engaged with the engagement groove 26.

A base end portion of an outer peripheral surface of the base portion 42 has a fixing protrusion 44 that protrudes outward in the radial direction. Furthermore, a fixing groove 45 is provided at a position on the outer peripheral surface of the base portion 42 adjacent to the fixing protrusion 44 in the axial direction. The fixing protrusion 44 and the fixing groove 45 extend in the circumferential direction.

The sensor case 5 that holds the elastic support member 4 is a member constituting a casing of the ultrasonic sensor 1, and is formed of a hard insulating synthetic resin such as polybutylene terephthalate in a single piece. Specifically, a case body 51 which is a main portion of the sensor case 5 has a substrate housing portion 52 and a projecting portion 53. The substrate housing portion 52 and the projecting portion 53 are formed seamlessly in a single piece.

The substrate housing portion 52 is formed in a bathtub shape that is opened in the first direction. The projecting portion 53 is a substantially cylindrical portion having a center axis parallel to the axial direction, and projects from the substrate housing portion 52 in the axial direction. The case body 51 is formed so that a space inside the substrate housing portion 52 and a space inside the projecting portion 53 communicate with each other.

The projecting portion 53 is configured to hold the elastic support member 4 at a tip end portion of the projecting portion 53. Specifically, a tip end portion of an inner peripheral surface of the projecting portion 53 has a support groove 54 with which the fixing protrusion 44 of the elastic support member 4 is engaged and a support protrusion 55 that is engaged with the fixing groove 45 of the elastic support member 4.

The mounting member 6 is configured to hold the ultrasonic sensor 1 to the bumper B by being fixed to the bumper B and the sensor case 5 in the vehicle-mounted state. Specifically, the mounting member 6 has a holding portion 61 and a flange portion 62.

The holding portion 61 is formed in a substantially cylindrical shape surrounding the projecting portion 53 of the sensor case 5 and the elastic support member 4. The flange portion 62 extends from a tip end portion of the holding portion 61 outward in the radial direction. At an outer portion of the flange portion 62 in the radial direction, the flange portion 62 is fixed to the bumper inner surface B2 by an adhesive layer (not shown) of a double-sided tape or the like.

The outer electrode 7 which constitutes a second electrode is provided at a position different from the element support portion 2 which constitutes the first electrode in an in-plane direction that intersects the directional axis of the ultrasonic microphone 1a. The "in-plane direction" is typically almost synonymous with the radial direction. Thus, in plan view, the outer electrode 7 is provided outside in the radial direction of the element support portion 2 which constitutes the first electrode in the present embodiment. Furthermore, the outer electrode 7 is provided in the vicinity of the element support portion 2.

The outer electrode 7 has a surface electrode portion 71 provided along the bumper B in the vehicle-mounted state and a tubular surface electrode portion 72 provided along the side surface of the element support portion 2 in the vehicle-mounted state. The surface electrode portion 71 and the tubular surface electrode portion 72 are formed of a conductor film, specifically, a metal thin film.

The surface electrode portion 71 is provided along the bumper inner surface B2 which is the surface of the bumper B on the side in the first direction. Specifically, the surface electrode portion 71 is fixed to a surface of the flange portion 62 that faces the bumper inner surface B2. The surface electrode portion 71 is provided corresponding to an inner portion of the flange portion 62 in the radial direction. In the present embodiment, the surface electrode portion 71 is formed in a substantially ring shape in plan view.

The tubular surface electrode portion 72 extends in the axial direction along the diaphragm support portion 21. The tubular surface electrode portion 72 is fixed to a cylindrical inner peripheral surface of the holding portion 61. The tubular surface electrode portion 72 is provided corresponding to the tip end portion of the holding portion 61. In the present embodiment, the tubular surface electrode portion 72 is formed in a cylindrical shape.

As described above, in the present embodiment, the outer electrode 7 is provided in the mounting member 6. Specifically, the outer electrode 7 is provided to an inner surface side of the mounting member 6. In the present embodiment, a tip end portion of the tubular surface electrode portion 72 is connected to an inner edge portion of the surface electrode portion 71 in the radial direction. Thus, the surface electrode portion 71 and the tubular surface electrode portion 72 are formed seamlessly in a single piece.

The wire section 8 is provided so that the ultrasonic microphone 1a and the outer electrode 7 are electrically connected to the circuit board 9. A portion of the wire section 8 on the circuit board 9 side is housed inside the case body 51. A space inside the case body 51 that houses the wire section 8 and the circuit board 9 is filled with a sealing resin R, such as silicone rubber, that has high insulation properties, low dielectric constant, chemical stability, and weather resistance.

Specifically, the wire section 8 includes a drive electrode wire 81, a reference electrode wire 82, and a second electrode wire 83. One end of the drive electrode wire 81 is electrically connected to the drive electrode 31 of the vibration element 3. The other end of the drive electrode wire 81 is electrically connected to the circuit board 9 via a connector 84. One end of the reference electrode wire 82 is electrically connected to the element support portion 2, specifically, to the diaphragm support portion 21. The other end of the reference electrode wire 82 is electrically connected to the circuit board 9 via the connector 84. One end of the second electrode wire 83 is electrically connected to the outer electrode 7. The other end of the second electrode wire 83 is electrically connected to the circuit board 9 via the connector 84.

The circuit board 9 is housed in the substrate housing portion 52. The circuit board 9 is mounted with a plurality of circuit elements including a temperature sensor 91 and a control circuit element 92. The temperature sensor 91 is provided so as to generate an output corresponding to an ambient temperature. The "ambient temperature" is a temperature corresponding to an outside air temperature around the ultrasonic sensor 1.

The control circuit element 92 is an ASIC or a CPU, and is provided so as to control operation of the ultrasonic sensor 1. ASIC is an abbreviation for Application Specific Integrated Circuit. CPU is an abbreviation for Central Processing Unit.

Figure 2:
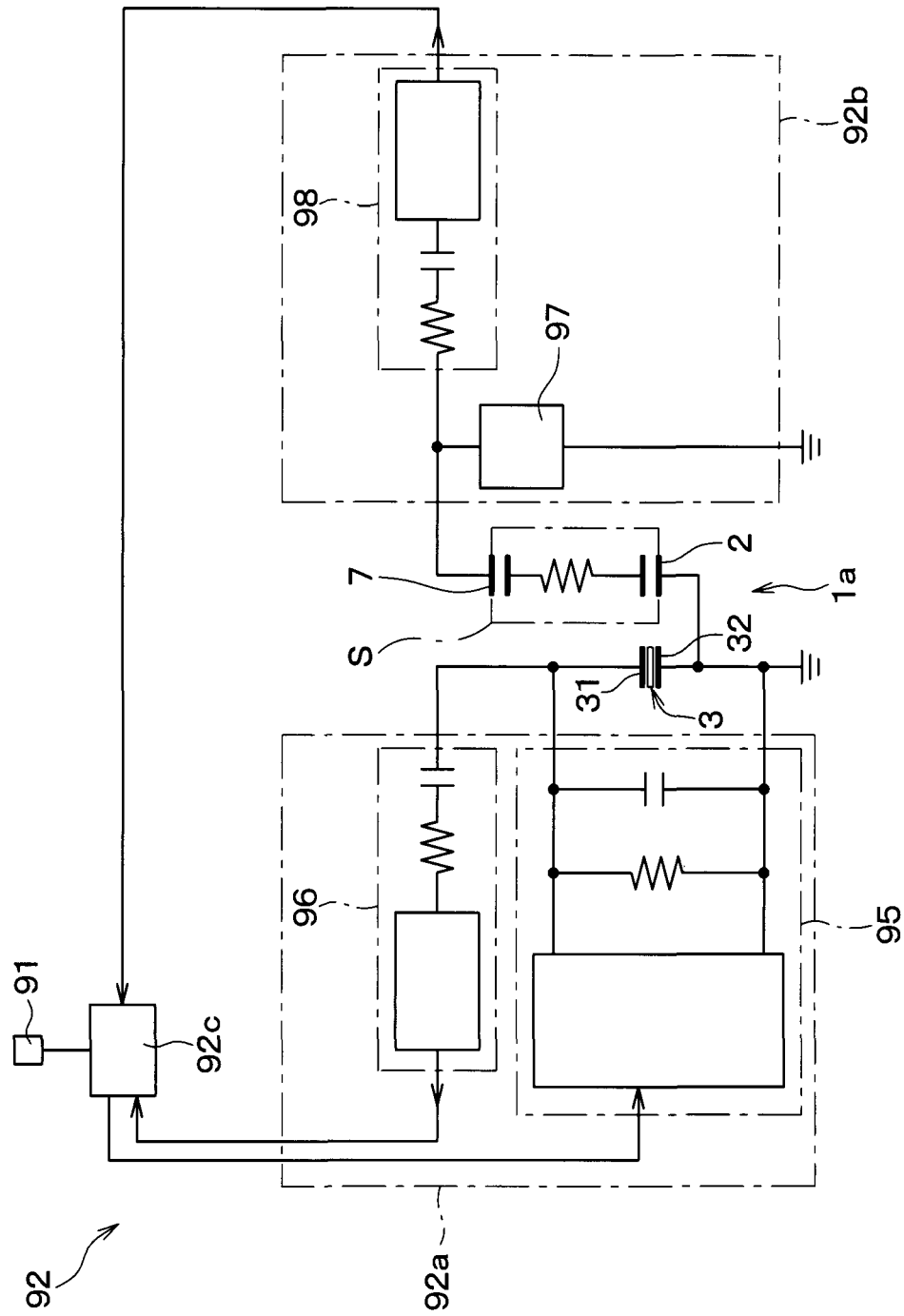
FIG. 2 is a diagram showing a specific example of a circuit configuration of a control circuit element shown in FIG. 1.

With reference to FIG. 2, the element support portion 2 which constitutes the first electrode and the outer electrode 7 constitute a capacitance C1. The capacitance C1 is provided in parallel to the vibration element 3.

The control circuit element 92 which constitutes a detection section includes a signal transmission reception section 92a, an impedance acquisition section 92b, and a control section 92c as a functional configuration implemented in the ASIC or the CPU.

The signal transmission reception section 92a is electrically connected to the drive electrode 31 and the reference electrode 32 so as to transmit and receive electrical signals including a drive signal and an output signal to and from the vibration element 3. Thus, the signal transmission reception section 92a is provided so as to input a drive signal into the vibration element 3 and receives an output signal from the vibration element 3. The impedance acquisition section 92b is provided so as to acquire an impedance between the element support portion 2 and the outer electrode 7.

The control section 92c is electrically connected to the temperature sensor 91. Furthermore, the control section 92c is provided so that signals can be transmitted to and received from the signal transmission reception section 92a and the impedance acquisition section 92b. Thus, the control section 92c controls operation of the signal transmission reception section 92a to control ultrasonic wave transmission/reception operation performed by the ultrasonic microphone 1a. Furthermore, the control section 92c is provided so as to detect the presence or absence of attached matter S attached from the outer surface 24 side to the ultrasonic sensor 1 on the basis of a change in the capacitance C1 caused by a change in the impedance acquired by the impedance acquisition section 92b. Specifically, the control section 92c is configured to detect the presence or absence of the attached matter S on the basis of the output of the temperature sensor 91 and the change in the capacitance C1.

When a predetermined object detection condition is satisfied, the control section 92c performs object detection operation of detecting an object around the ultrasonic sensor 1. Examples of the object detection condition include a condition that a shift position of the vehicle to which the ultrasonic sensor 1 is mounted is a position that allows the vehicle to travel and a condition that a vehicle speed of the vehicle is less than a predetermined value. At a timing at which the object detection operation is not performed, the control section 92c performs detection of the presence or absence of the attached matter S using the impedance acquisition section 92b.

Furthermore, the control section 92c is configured to detect the presence or absence of the attached matter S considering the ambient temperature acquired from the output of the temperature sensor 91. Specifically, the control section 92c sets an output frequency f of a driver circuit 97. Furthermore, the control section 92c corrects the change in the capacitance on the basis of reference data at a predetermined reference temperature, for example, 18 degrees centigrade and the ambient temperature acquired from the output of the temperature sensor 91. Furthermore, the control section 92c determines the attachment of the attached matter S when a corrected capacitance change $\Delta C$ exceeds a threshold $\Delta Cth$ (f). The threshold $\Delta Cth$ (f) is a value varying according to the output frequency f. A look-up table or a map that defines a relationship between the output frequency f and the threshold $\Delta Cth$ (f) is stored in advance.

The signal transmission reception section 92a includes an ultrasonic transmission circuit 95 and a reflected wave reception circuit 96. The impedance acquisition section 92b includes the driver circuit 97 and a receiver circuit 98.

The ultrasonic transmission circuit 95 is configured to input a drive signal into the vibration element 3 so that the vibration element 3 performs operation of transmitting a search wave in an ultrasonic band. The reflected wave reception circuit 96 is configured to receive an output signal generated in the vibration element 3 when the diaphragm portion 22 is excited by a reflected wave of the search wave reflected by an object that is present around the ultrasonic sensor 1 and to perform a process of amplification or the like. A specific circuit configuration of the ultrasonic transmission circuit 95 and the reflected wave reception circuit 96 is well known and is thus not described in more detail herein.

The driver circuit 97 and the receiver circuit 98 are electrically connected to the outer electrode 7. The driver circuit 97 is provided so as to output an AC power supply voltage for acquiring an impedance between the element support portion 2 including the attached matter S and the outer electrode 7. The driver circuit 97 is configured such that the output frequency of the AC power supply voltage is variable. The receiver circuit 98 has a well-known integrator circuit or the like, and is configured to generate an output corresponding to the impedance between the element support portion 2 and the outer electrode 7. The principles of acquisition, i.e., measurement of the impedance and a specific circuit configuration of the driver circuit 97 and the receiver circuit 98 are well known and are thus not described in more detail herein.

(Operation Overview)

An overview of operation performed by the configuration of the present embodiment together with effects of the configuration will be described below with reference to the drawings. FIG. 3 is a time chart corresponding to an illustrative operation example of the ultrasonic sensor 1.

With reference to FIG. 3, during a period from when, at time t0, an ignition switch of the vehicle is turned on to when, at time t1, the object detection condition is satisfied, neither the transmission of a search wave from the ultrasonic sensor 1 nor the reception of a reflected wave by the ultrasonic sensor 1 is performed. When, at time t1, the object detection condition is satisfied, the transmission of a search wave from the ultrasonic sensor 1 and the reception of a reflected wave by the ultrasonic sensor 1 are alternately performed. Subsequently, when the vehicle speed is increased so that, at time t2, the object detection condition is no longer satisfied, the transmission of a search wave and the reception of a reflected wave are stopped. Subsequently, when the vehicle speed is reduced to stop the vehicle so that, at time t3, the object detection condition is satisfied, the transmission of a search wave and the reception of a reflected wave are resumed.

In the present embodiment, attached-matter detection operation, that is, operation of detecting the presence or absence of the attached matter S attached to the ultrasonic sensor 1 is not performed during a period from time t1 to time t2 during which the object detection condition is satisfied and the object detection operation is performed. Similarly, at time t3 and later, the attached-matter detection operation is not performed until the object detection condition is no longer satisfied again.

On the other hand, the attached-matter detection operation is performed at time t0 during a period from time t0 to time t1 and/or at time tb during a period from time t2 to time t3 at which the object detection operation is not performed, that is, an operation mode of the ultrasonic sensor 1 is neither in a transmission mode nor a reception mode. The "transmission mode" is an operation mode in which a drive signal for driving the vibration element 3 is inputted into the vibration element 3. The "reception mode" is an operation mode in which the object detection operation of detecting an object around the ultrasonic sensor 1 is performed on the basis of an output signal from the vibration element 3. Thus, in the present embodiment, the attached-matter detection operation is performed at a timing at which neither the transmission of a search wave nor the reception of a received wave is performed. This makes it possible to perform the attached-matter detection while maintaining good accuracy in the object detection.

With reference to FIG. 1, typically, the ultrasonic sensor 1 is mounted to the bumper B so that the first direction D1 and the second direction D2 are substantially orthogonal to a vehicle height direction. Accordingly, with regard to gravity acting on the attached matter S attached from the outer surface 24 side of the element support portion 2 to the ultrasonic sensor 1, almost no gravity component parallel to the direction of vibration of the diaphragm portion 22 is generated. Thus, an impedance of an equivalent circuit of mechanical vibration in the microphone composed of the element support portion 2 and the vibration element 3 is hardly changed according to the presence or absence of the attached matter S. Furthermore, also when the attached matter S is a lightweight material such as snow or water, the impedance of the equivalent circuit of mechanical vibration is hardly changed according to the presence or absence of the attached matter S.

In this regard, in the configuration of the present embodiment, the capacitance C1 is formed between the element support portion 2 and the outer electrode 7. The capacitance C1 is changed according to the presence or absence of attachment of the attached matter S from the outer surface 24 side of the element support portion 2 to the ultrasonic sensor 1. Thus, the control section 92c is capable of detecting the presence or absence of the attached matter S on the basis of the change in the capacitance C1 between the element support portion 2 and the outer electrode 7.

According to such a configuration, with regard to the force of gravity acting on the attached matter S attached to the outer surface of the element support portion 2, even when almost no gravity component parallel to the direction of vibration of the diaphragm portion 22 is present, the presence or absence of attachment of the attached matter S can be detected with high accuracy. Furthermore, according to this configuration, even when the attached matter S is a lightweight object such as snow or water, the presence or absence of attachment of the attached matter S can be detected with high accuracy.

As the attached-matter detection method of detecting the attached matter S attached to the ultrasonic sensor 1, a method using a resistance value between the electrodes may be able to be used. However, such a method is difficult to use due to oxidation of the electrodes, prevention of electric shock to a person in the surrounding area, designability issues, and the like. In fact, as in the present embodiment, the insulating film 25 is usually formed on the surface of the ultrasonic microphone 1a for corrosion prevention and the like.

In this regard, in the configuration of the present embodiment, the control section 92c detects the presence or absence of the attached matter S on the basis of the change in the capacitance C1 between the element support portion 2 and the outer electrode 7. Therefore, according to this configuration, even when the insulating film 25 is formed on the surface of the ultrasonic microphone 1a, the presence or absence of attachment of the attached matter S can be detected with high accuracy.

As the attached-matter detection method of detecting the attached matter S attached to the ultrasonic sensor 1, a method using reverberation time has been conventionally known. In such a method, however, climate change such as a change in atmospheric temperature or a change in weather may affect accuracy in the detection.

In this regard, in the configuration of the present embodiment, the control section 92c detects the presence or absence of the attached matter S considering the ambient temperature acquired from the output of the temperature sensor 91. Therefore, according to this configuration, regardless of climate change, the presence or absence of attachment of the attached matter S can be detected with high accuracy.

In the configuration of the present embodiment, the element support portion 2 constituting the first electrode is formed as the metal member in which the diaphragm support portion 21 and the diaphragm portion 22 are formed in a single piece. Furthermore, the element support portion 2 is electrically connected to the reference electrode 32 of the vibration element 3. Therefore, according to this configuration, detection of the attached matter S with good sensitivity can be achieved by a structure as simple as possible.

In the configuration of the present embodiment, the outer electrode 7 is provided in the mounting member 6 which is a component of the ultrasonic sensor 1. Thus, no special working process for placing the outer electrode 7 is required. Therefore, according to this configuration, a configuration for detecting the attached matter S is achieved by a sensor mounting process similar to a conventional process for mounting an ultrasonic sensor.

In the configuration of the present embodiment, the outer electrode 7 has the surface electrode portion 71 and the tubular surface electrode portion 72. The tubular surface electrode portion 72 is arranged along the diaphragm support portion 21. In other words, between the diaphragm support portion 21 of the element support portion 2 constituting the first electrode and the tubular surface electrode portion 72 constituting the second electrode, the ultrasonic sensor 1 has a portion in which the diaphragm support portion 21 and the support tubular portion 41 face each other and a portion in which the support tubular portion 41 and the holding portion 61 face each other. Therefore, according to this configuration, even when the attached matter S is a fluid such as water, and is not present on the outer surface 24 and enters the portion between the diaphragm support portion 21 and the support tubular portion 41 or the portion between the support tubular portion 41 and the holding portion 61, the attached matter S can be detected in a favorable manner.

Figure 4A:
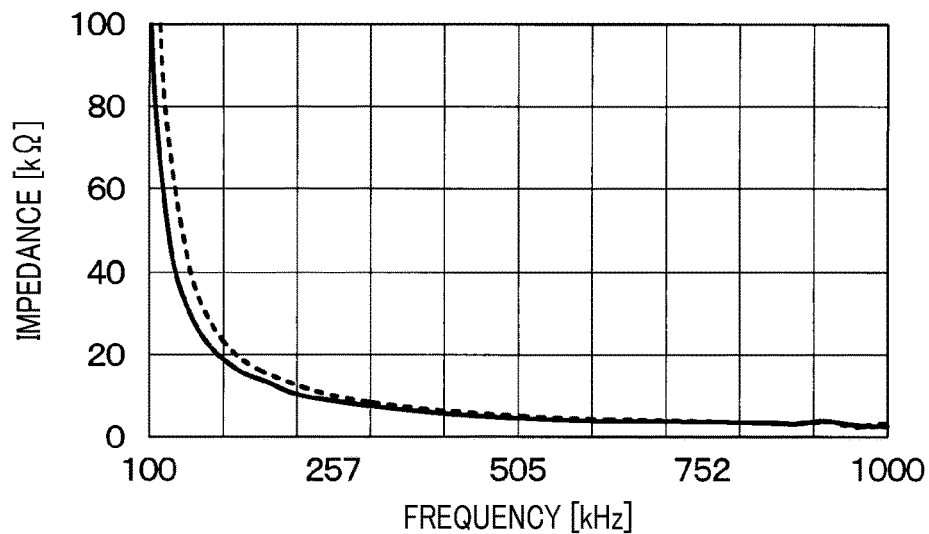
FIG. 4A is a graph showing a relationship between a frequency and a change in impedance.
Figure 4B:
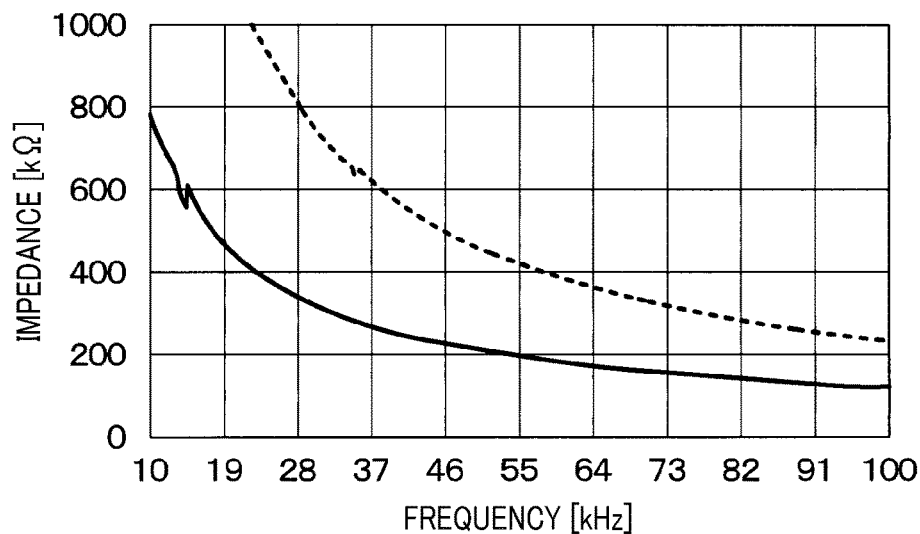
FIG. 4B is a graph showing a relationship between a frequency and a change in impedance.

FIGS. 4A and 4B show a change in the impedance between the element support portion 2 and the outer electrode 7 when the output frequency f of the driver circuit 97 is varied. In FIGS. 4A and 4B, a dashed line indicates a result of the impedance measurement before the attached matter S is attached, and a solid line indicates a result of the impedance measurement when water is attached as the attached matter S.

As shown in FIG. 4A, in a high frequency region, specifically, in a frequency region of 100 kHz or more, the change in the impedance due to the attachment of the attached matter S is small, and thus the accuracy in the attached-matter detection is low. In this frequency region, however, an initial impedance is low, and thus the ultrasonic sensor 1 is less likely to be affected by noise.

On the other hand, as shown in FIG. 4B, in a low frequency region, specifically, in a frequency region of less than 100 kHz, the change in the impedance due to the attachment of the attached matter S is large. In this frequency region, an inductance component of the attached matter S can be ignored. Therefore, in this frequency region, the accuracy in the attached-matter detection is high. In this frequency region, however, an initial impedance is high, and thus the ultrasonic sensor 1 is more likely to be affected by noise.

Therefore, the attached-matter detection is preferably performed on the basis of a first impedance change at a first frequency included in a high frequency region, specifically, in a frequency region of 100 kHz or more and a second impedance change at a second frequency included in a low frequency region, specifically, in a frequency region of less than 100 kHz. Specifically, for example, the attachment of the attached matter S can be determined when a capacitance change $\Delta C$ (f1) exceeds a threshold $\Delta Cth$ (f1) at a first frequency f1 or a capacitance change $\Delta C$ (f2) exceeds a threshold $\Delta Cth$ (f2) at a second frequency f2. Thus, the presence or absence of attachment of the attached matter S can be detected with even higher accuracy.

(Modifications)

The present disclosure is not limited to the above embodiment. Therefore, the embodiment may be appropriately changed. Typical modifications will be described below. In the following description of the modifications, differences from the embodiment are mainly described. In the embodiment and modifications, the same or equivalent portions are given the same reference numerals. In the following description of the modifications, therefore, the description of the embodiment may be appropriately incorporated for components given the same reference numerals as the embodiment unless there is a technical contradiction or special additional description.

The object on which the ultrasonic sensor 1 is mounted is not limited to the bumper B. Thus, for example, the ultrasonic sensor 1 may be mounted to a body panel of the vehicle. In this case, the surface electrode portion 71 may be provided along the body panel.

The object on which the ultrasonic sensor 1 is mounted is not limited to the vehicle. Thus, for example, the ultrasonic sensor 1 may also be mounted on conveyors provided in factories and the like, agricultural equipment (e.g., cultivators and the like), small aircrafts, and the like.

The ultrasonic sensor 1 is not limited to the configuration having both functions of transmitting and receiving ultrasonic waves. Thus, the ultrasonic sensor 1 specifically designed to transmit a search wave and the ultrasonic sensor 1 specifically designed to receive a reflected wave may be separately mounted to the vehicle. Also in such a case, the present disclosure can be applied in a favorable manner.

In the embodiment, the entire element support portion 2 is formed in a single piece as the metal member. However, the present disclosure is not limited to such a configuration. Specifically, for example, the element support portion 2 may be formed of a conductive synthetic resin in a single piece. Also in this configuration, the entire element support portion 2 functions as the first electrode.

In the embodiment, the entire element support portion 2 is configured to function as the first electrode. However, the present disclosure is not limited to such a configuration. Specifically, for example, the diaphragm support portion 21 may be formed of an insulating synthetic resin. Thus, the diaphragm portion 22 which is a plate-shaped member that is made of metal and functions as the first electrode may be mounted at the tip end portion of the diaphragm support portion 21 made of a synthetic resin. Conversely, the diaphragm portion 22 may be formed of an insulating synthetic resin. Thus, the diaphragm portion 22 which is a plate-shaped member made of an insulating synthetic resin may be mounted at the tip end portion of the diaphragm support portion 21 that is made of metal and functions as the first electrode.

The entire element support portion 2 may be formed in a single piece as an insulating synthetic resin member. In this case, as shown in FIGS. 5 and 6, the reference electrode 32 may be provided so that a part of the reference electrode 32 is exposed on the principal surface of the piezoelectric member 30 on which the drive electrode 31 is provided.

According to such a configuration, the drive electrode 31 and the reference electrode 32 are exposed in the first direction on the same principal surface side of the piezoelectric member 30. Thus, a portion at which the drive electrode 31 is electrically connected to the drive electrode wire 81 and a portion at which the reference electrode 32 is electrically connected to the reference electrode wire 82 can be provided on the same principal surface side of the piezoelectric member 30. Therefore, according to this configuration, the wires can be electrically connected to the vibration element 3 in a favorable manner.

Figure 5:
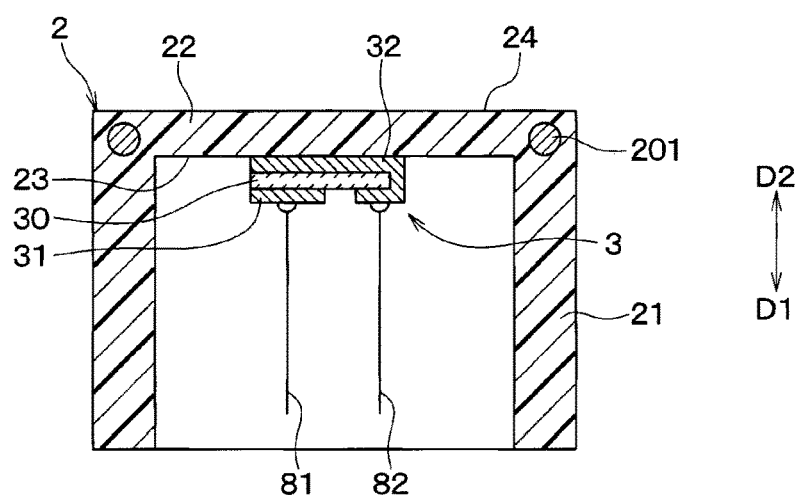
FIG. 5 is a side cross-sectional view showing a schematic configuration of a modification of an element support portion shown in FIG. 1.
Figure 6:
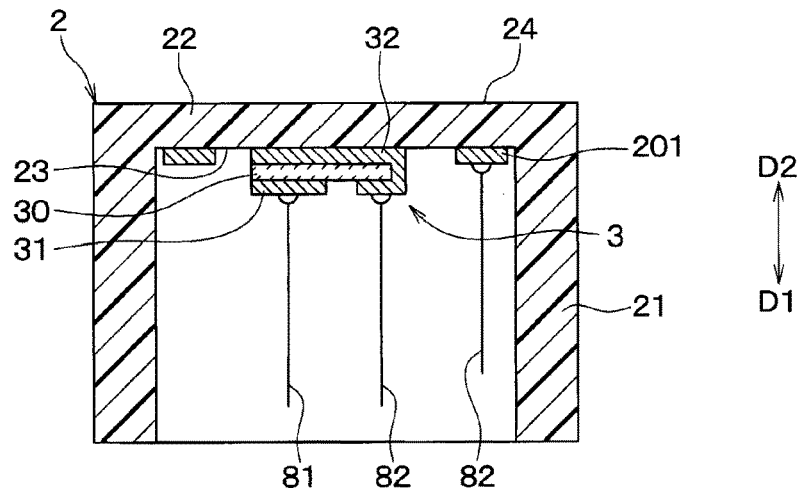
FIG. 6 is a side cross-sectional view showing a schematic configuration of another modification of the element support portion shown in FIG. 1.

As shown in FIGS. 5 and 6, when the entire element support portion 2 is formed in a single piece as the insulating synthetic resin member, an inner electrode 201 which constitutes the first electrode may be provided in the element support portion 2. The inner electrode 201 may be formed, for example, of metal or conductive synthetic resin.

The inner electrode 201 may be provided in the diaphragm support portion 21 or the diaphragm portion 22. Specifically, for example, as shown in FIG. 5, the inner electrode 201 may be a ring-shaped electrode provided at an upper end portion of the diaphragm support portion 21 or the outer edge portion of the diaphragm portion 22. Such a ring-shaped electrode may be embedded inside the element support portion 2 or may be provided so as to be exposed on an outer portion of the element support portion 2.

Alternatively, for example, the inner electrode 201 may be a cylindrical electrode provided in the diaphragm support portion 21. Such a cylindrical electrode may be embedded inside the element support portion 2 or may be provided so as to be exposed on the outer portion of the element support portion 2.

Alternatively, for example, as shown in FIG. 6, the inner electrode 201 may be a conductor film provided in at least an outer edge portion of the inner surface 23 of the diaphragm portion 22. The conductor film shown in FIG. 6 is typically formed of a conductor metal film.

In the embodiment shown in FIG. 1, the element support portion 2 constituting the first electrode is integrated with the reference electrode 32 in terms of both the device configuration and the circuit configuration. On the other hand, in the configuration shown in FIGS. 5 and 6, the inner electrode 201 is separated from the reference electrode 32 in terms of both the device configuration and the circuit configuration. In this case, even when the inner electrode 201 is grounded, the reference electrode 32 is not necessarily indirectly grounded accordingly.

Figure 7A:
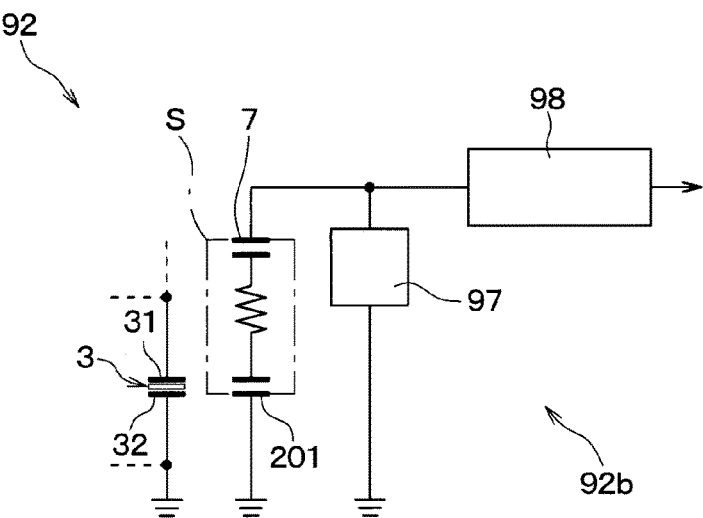
FIG. 7A is a diagram showing a specific example of a circuit configuration of the control circuit element when the element support portion shown in FIGS. 5 and 6 is used.

Specifically, as shown in FIG. 7A, it is possible to ground the inner electrode 201 and also ground the reference electrode 32. In this case, a circuit configuration similar to the circuit configuration in FIG. 2 can be achieved. In FIG. 7A, for simplification of the illustration, the signal transmission reception section 92a and the like in FIG. 2 are not illustrated. The same applies to FIG. 7B and the like described later.

Figure 7B:
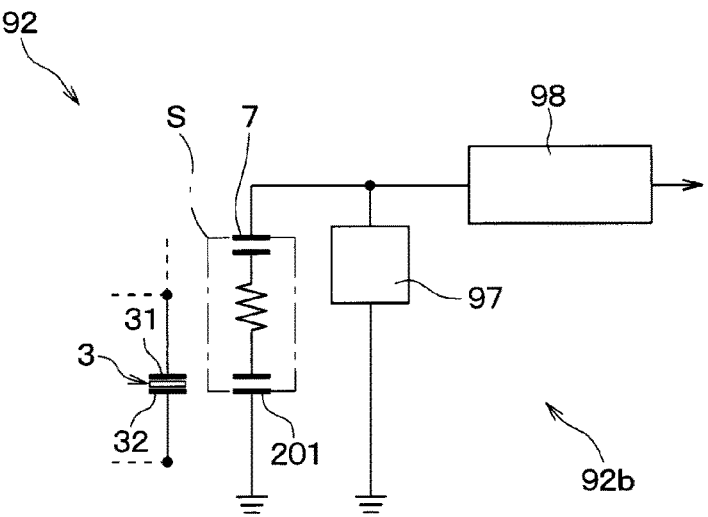
FIG. 7B is a diagram showing a specific example of a circuit configuration of the control circuit element when the element support portion shown in FIGS. 5 and 6 is used.

On the other hand, as shown in FIG. 7B, it is possible to ground the inner electrode 201 without grounding the reference electrode 32. Thus, the inner electrode 201 can be grounded while being electrically insulated from the reference electrode 32 which is the electrode layer that constitutes the vibration element 3 and that is fixedly supported on the diaphragm portion 22.

According to such a configuration, by completely differentiating the ultrasonic transmission circuit 95 and the reflected wave reception circuit 96, it is possible to favorably prevent a reduction in S/N ratio due to amplification of noise such as common mode noise by an amplifier. Furthermore, by grounding the inner electrode 201, an electromagnetic shield can be provided in the element support portion 2 which is a housing of the ultrasonic microphone 1a, thereby improving robustness of the ultrasonic sensor 1 against noise. Specifically, a reduction in EMC immunity and ESD immunity can be favorably prevented. EMC is an abbreviation for Electromagnetic Compatibility. ESD is an abbreviation for Electrostatic Discharge. Thus, according to this configuration, the presence or absence of attachment of the attached matter S can be detected with even higher accuracy while achieving a favorable S/N ratio, EMC immunity, and ESD immunity in the object detection operation.

Figure 8:
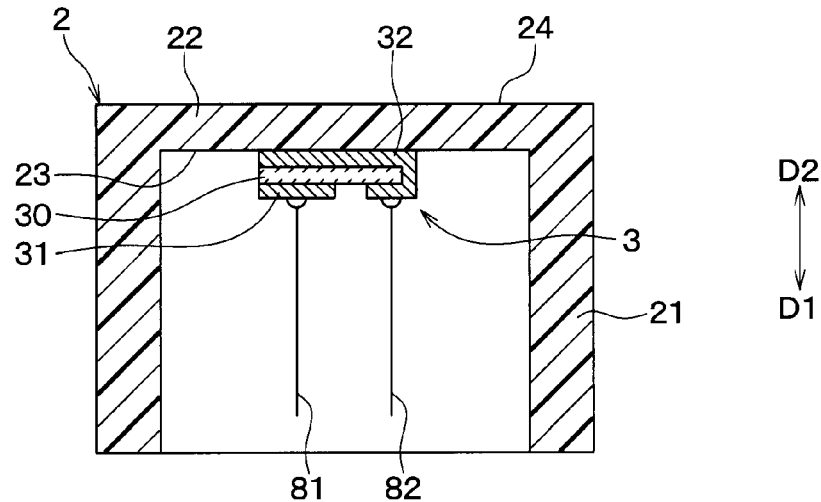
FIG. 8 is a side cross-sectional view showing a schematic configuration of still another modification of the element support portion shown in FIG. 1.
Figure 9:
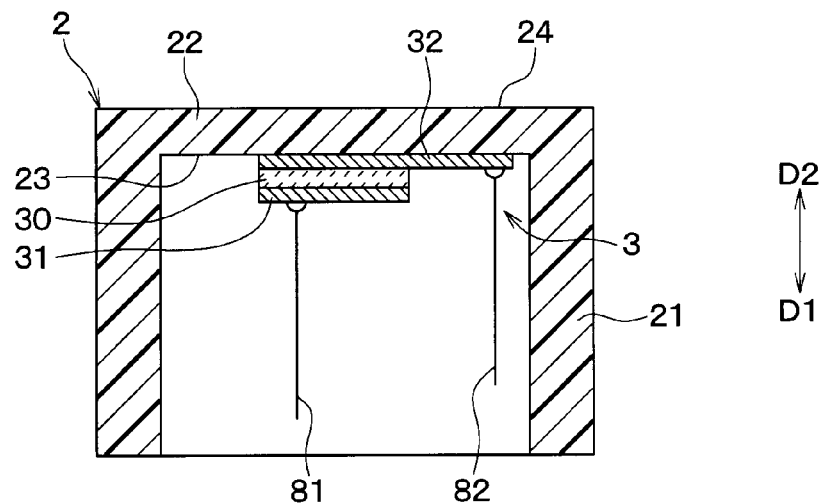
FIG. 9 is a side cross-sectional view showing a schematic configuration of still another modification of the element support portion shown in FIG. 1.

The reference electrode 32 provided on the inner surface of the diaphragm portion 22 may be used as the first electrode. FIGS. 8 and 9 show a configuration in which the reference electrode 32 is used as the first electrode instead of the inner electrode 201 shown in FIGS. 5 and 6.

FIG. 8 corresponds to a configuration obtained by omitting the inner electrode 201 from the configuration shown in FIGS. 5 and 6. FIG. 9 corresponds to a configuration in which the reference electrode 32 is not exposed on the principal surface of the piezoelectric member 30 on which the drive electrode 31 is provided and the reference electrode 32 is provided on the inner surface 23 of the diaphragm portion 22 so as to have a larger area than the piezoelectric member 30. In the configuration shown in FIG. 9, the drive electrode 31 and the reference electrode 32 can have an area as large as possible. Therefore, according to this configuration, sensitivity of the ultrasonic sensor 1 for the object detection and the attached-matter detection can be improved as much as possible.

Figure 10:
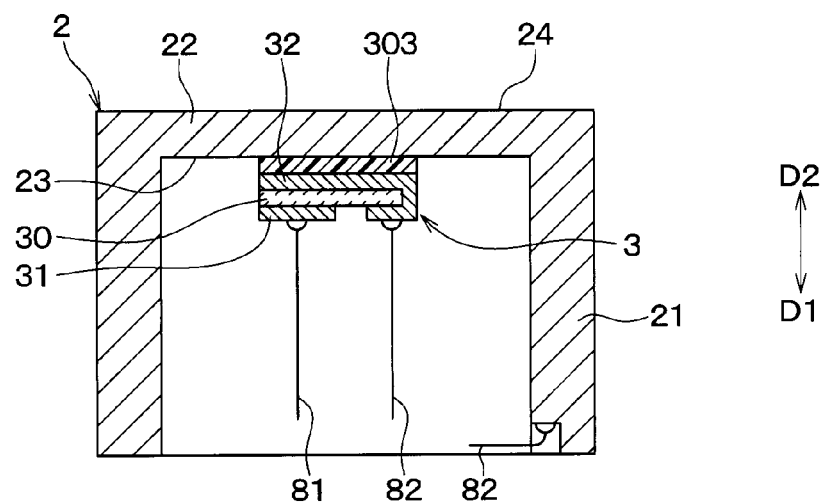
FIG. 10 is a side cross-sectional view showing a schematic configuration of still another modification of the element support portion shown in FIG. 1.

As shown in FIG. 10, there may be a case where the diaphragm portion 22 is a metal plate and the reference electrode 32 is provided on both surfaces of the piezoelectric member 30. In this case, an insulating layer 303 is provided between the diaphragm portion 22 and the reference electrode 32. The insulating layer 303 may be typically formed of an insulating adhesive layer.

In such a configuration, the element support portion 2 and the reference electrode 32 constituting the first electrode can be electrically insulated from each other in a favorable manner. Therefore, according to this configuration, the effect of the circuit configuration in FIG. 7B can be obtained. Thus, according to this configuration, the presence or absence of attachment of the attached matter S can be detected with even higher accuracy while achieving a favorable S/N ratio, EMC immunity, and ESD immunity in the object detection operation.

The present disclosure is not limited to the configuration in which the outer electrode 7 is provided on the inner surface side of the mounting member 6. Specifically, for example, the outer electrode 7 may be provided on an outer surface side of the mounting member 6. Alternatively, for example, the outer electrode 7 may be integrated with the mounting member 6 as a part of the mounting member 6. Thus, the outer electrode 7 may be the mounting member 6 itself or a part of the mounting member 6 formed of a conductive synthetic resin. Alternatively, for example, the outer electrode 7 may be embedded inside the mounting member 6.

The outer electrode 7 may be provided in the elastic support member 4. Also such a configuration requires no special working process for placing the outer electrode 7. Specifically, for example, as shown in FIG. 11, the ring or cylindrical outer electrode 7 having a center axis in the axial direction may be embedded in the elastic support member 4 made of an insulating synthetic resin.

Alternatively, for example, when the elastic support member 4 is formed of a conductive rubber, the elastic support member 4 can be used as the second electrode. In this case, the outer electrode 7 in FIG. 1 may be omitted.

As shown in FIG. 12, the outer electrode 7 may be provided on the bumper inner surface B2. Alternatively, the outer electrode 7 may be embedded around the mounting hole B3 of the bumper B. Alternatively, the outer electrode 7 may be a part of the bumper B formed by adding a conductive filler to a portion of the bumper B facing the mounting hole B3.

As shown in FIGS. 13 and 14, the surface electrode portion 71 and the tubular surface electrode portion 72 may be separately formed so as not to electrically connected to each other. In other words, the surface electrode portion 71 and the tubular surface electrode portion 72 may be provided so that each of the surface electrode portion 71 and the tubular surface electrode portion 72 functions as the separate outer electrode 7. In this case, the control section 92c can detect the presence or absence of the attached matter S and an attachment position of the attached matter S on the basis of a change in capacitance between the element support portion 2 and the surface electrode portion 71 and a change in capacitance between the element support portion 2 and the tubular surface electrode portion 72.

With reference to FIGS. 13 and 14, a plurality of surface electrode portions 71 may be arranged in the circumferential direction so as not to electrically connected to each other. In this case, the control section 92c can detect the presence or absence of the attached matter S and an attachment position of the attached matter S on the basis of a change in capacitance between each of the plurality of surface electrode portions 71 and the element support portion 2.

Similarly, a plurality of tubular surface electrode portions 72 may be arranged in the circumferential direction so as not to electrically connected to each other. In this case, the control section 92c can detect the presence or absence of the attached matter S and an attachment position of the attached matter S on the basis of a change in capacitance between each of the tubular surface electrode portions 72 and the element support portion 2.

The circuit configuration is not limited to the above specific examples, either. Specifically, in the above specific examples, as shown in FIGS. 2, 7A, and 7B, the element support portion 2 or the inner electrode 201 as the first electrode is ground. However, the present disclosure is not limited to such a circuit configuration.

Figure 15A:
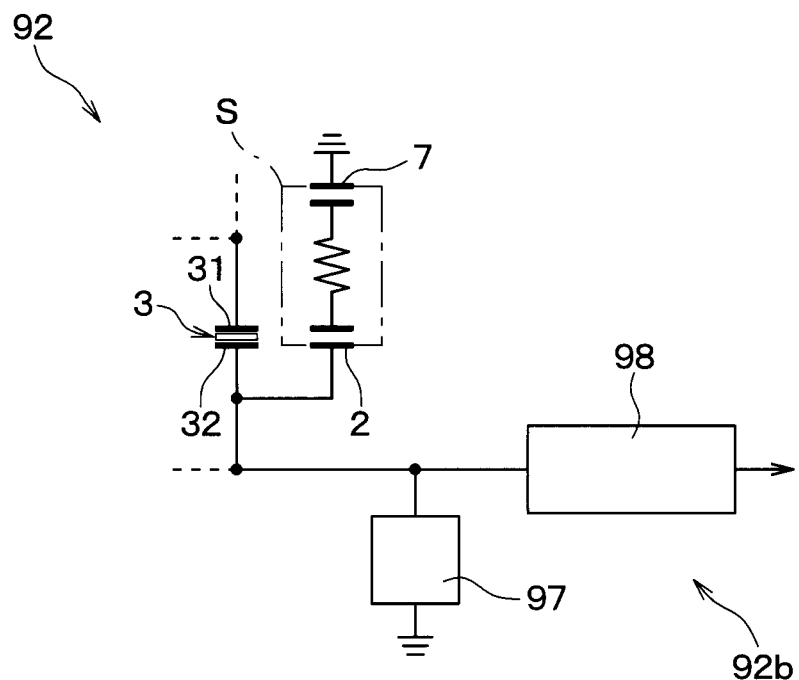
FIG. 15A is a diagram showing a modification of the circuit configuration of the control circuit element shown in FIG. 2.
Figure 15B:
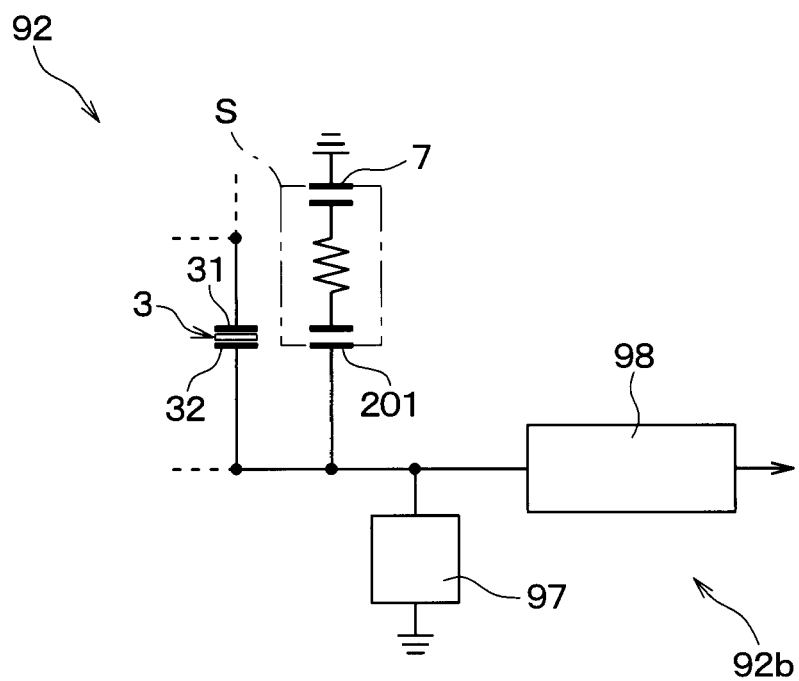
FIG. 15B is a diagram showing a modification of the circuit configuration of the control circuit element shown in FIG. 7A or FIG. 7B.

As with FIG. 1, FIG. 15A shows the case where the first electrode is constituted by the element support portion 2. On the other hand, as with FIG. 5 and the like, FIG. 15B shows the case where the inner electrode 201 is provided. The same applies to FIG. 16A, FIG. 16B, and the like described later.

For example, as shown in FIGS. 15A and 15B, the outer electrode 7 may be grounded. In this case, the driver circuit 97 and the receiver circuit 98 are electrically connected to the element support portion 2 or the inner electrode 201 as the first electrode. Furthermore, the driver circuit 97 and the receiver circuit 98 are electrically connected to the element support portion 2 that functions as an electrode used as a pair with the drive electrode 31 of the vibration element 3 or electrically connected to the reference electrode 32.

In such a configuration, a potential of the outer electrode 7 located outside the vibration element 3 is always a ground potential. Therefore, according to this configuration, robustness of the ultrasonic sensor 1 against noise is improved. Furthermore, an output voltage of the driver circuit 97 can be applied to the vibration element 3. Thus, the driver circuit 97 can have the function of the ultrasonic transmission circuit 95 shown in FIG. 2. Therefore, according to this configuration, the attached-matter detection can be performed while preventing, as much as possible, the circuit configuration of the ultrasonic sensor 1 being complicated.

Figure 16A:
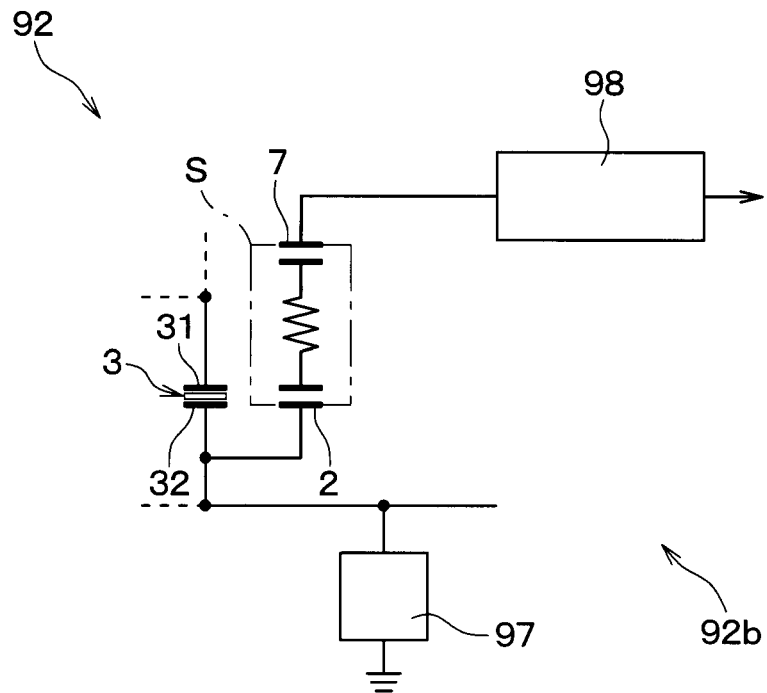
FIG. 16A is a diagram showing another modification of the circuit configuration of the control circuit element shown in FIG. 2.
Figure 16B:
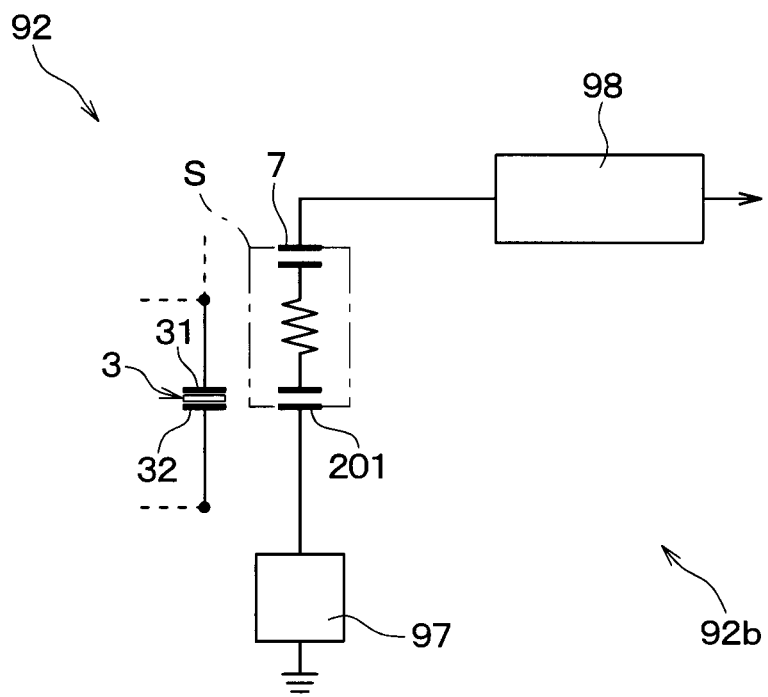
FIG. 16B is a diagram showing another modification of the circuit configuration of the control circuit element shown in FIG. 7A or FIG. 7B.
Figure 17A:
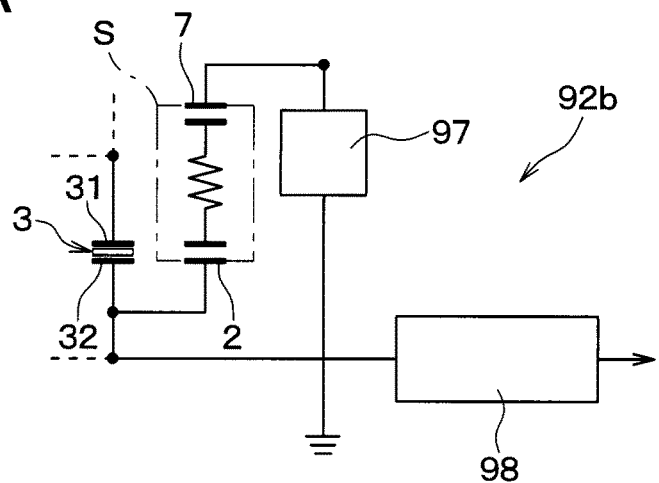
FIG. 17A is a diagram showing still another modification of the circuit configuration of the control circuit element shown in FIG. 2.
Figure 17B:
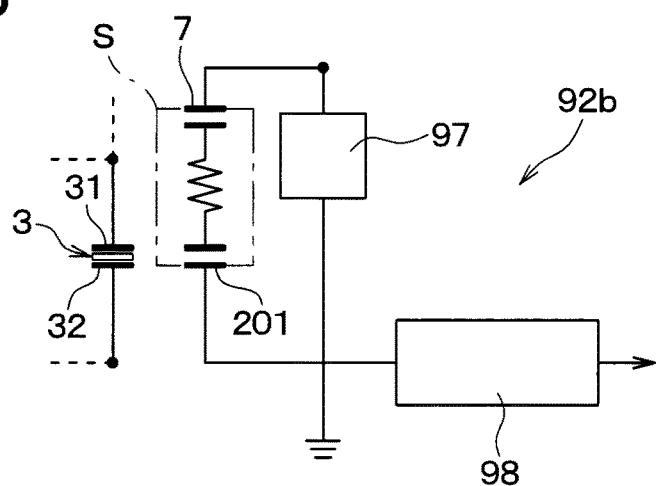
FIG. 17B is a diagram showing still another modification of the circuit configuration of the control circuit element shown in FIG. 7A or FIG. 7B.

As shown in FIGS. 16A and 16B, the circuit configuration may be such that the driver circuit 97 is electrically connected to the element support portion 2 or the inner electrode 201 as the first electrode and the receiver circuit 98 is electrically connected to the outer electrode 7. Conversely, as shown in FIGS. 17A and 17B, the circuit configuration may be such that the receiver circuit 98 is electrically connected to the element support portion 2 or the inner electrode 201 as the first electrode and the driver circuit 97 is electrically connected to the outer electrode 7.

Figure 18:
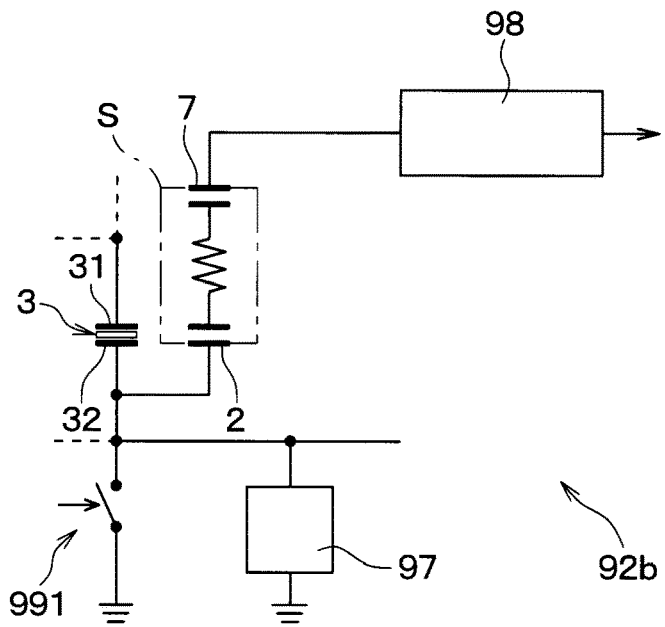
FIG. 18 is a diagram showing still another modification of the circuit configuration of the control circuit element shown in FIG. 2.
Figure 19:
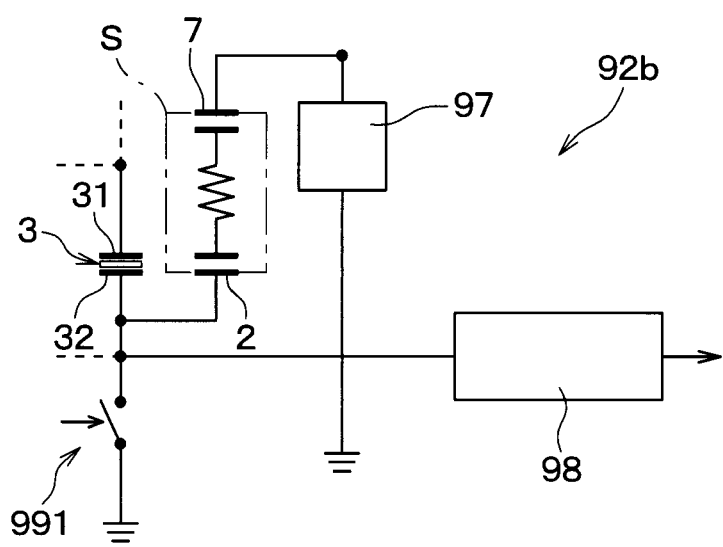
FIG. 19 is a diagram showing still another modification of the circuit configuration of the control circuit element shown in FIG. 2.

FIG. 18 shows a circuit configuration obtained by changing a part of the circuit configuration in FIG. 16A. Similarly, FIG. 19 shows a circuit configuration obtained by changing a part of the circuit configuration in FIG. 17A. As shown in FIGS. 18 and 19, a switch 991 may be provided between the element support portion 2 as the first electrode and a grounded end. Thus, when the switch 991 is in a on state, the first electrode provided on the element support portion 2 side may be grounded via the switch 991.

Under the control of the control section 92c shown in FIG. 2, the switch 991 is turned on when no impedance measurement is performed, and the switch 991 is turned off when impedance measurement is performed. Thus, while no impedance measurement is performed, typically, during the process of transmitting a search wave and during the process of receiving a reflected wave, the first electrode provided on the element support portion 2 side is grounded. Therefore, according to such a configuration, robustness of the ultrasonic sensor 1 against noise is improved.

The piezoelectric member 30 may be adhered to the inner surface 23 of the diaphragm portion 22 with a conductive adhesive. Thus, the diaphragm portion 22 itself may constitute a pair of electrodes constituting the piezoelectric element. Thus, in this case, the reference electrode 32 may be omitted.

The vibration element 3 is not limited to the piezoelectric element. Thus, for example, the ultrasonic microphone 1a may have a configuration of a capacitance microphone.

The temperature sensor 91 may be electrically connected to the control circuit element 92 via a vehicle-mounted communication network. The vehicle-mounted communication network is configured in accordance with vehicle-mounted LAN standards such as CAN (international registered trademark). CAN (international registered trademark) is an abbreviation for Controller Area Network. LAN is an abbreviation for Local Area Network. Alternatively, the temperature sensor 91 may be incorporated in the control circuit element 92.

The present disclosure is not limited to the above specific operation example. Thus, for example, while the object detection condition is satisfied, the operation mode may always be in the reception mode. Furthermore, the attached-matter detection operation is not limited to the timing at which neither the transmission of a search wave nor the reception of a received wave is performed. Specifically, for example, at a timing at which the transmission of a search wave is not performed, the attached-matter detection operation may be performed even during the object detection operation.

The attached-matter detection operation may be performed by the impedance acquisition section 92b.

A plurality of components formed seamlessly in a single piece in the above description may be formed by bonding separate members together. Similarly, a plurality of components formed by bonding separate members together may be formed seamlessly in a single piece.

A plurality of components formed of the same material in the above description may be formed of different materials. Similarly, a plurality of components formed of different materials may be formed of the same material.

It is needless to say that an element constituting the above embodiment is not necessarily essential unless, for example, the element is explicitly stated to be particularly essential or the element is considered to be apparently essential in principle. When a numerical value such as the number, numerical value, amount, or range associated with the components is mentioned, the present disclosure is not limited to the specific number unless, for example, the numerical value is explicitly stated to be particularly essential or the present disclosure is apparently limited to the specific number in principle. Similarly, when a shape, direction, positional relationship, or the like of a component or the like is mentioned, the present disclosure is not limited to the shape, direction, positional relationship, or the like unless, for example, the shape, direction, positional relationship, or the like is explicitly stated to be particularly essential or the present disclosure is limited to the specific shape, direction, positional relationship, or the like in principle.

Modifications are not limited to the above modifications, either. Furthermore, a plurality of modifications may be combined with each other. Furthermore, all or part of the above embodiment and all or part of any of the modifications may be combined with each other.

According to an aspect of the present disclosure, an ultrasonic sensor (1) includes:

a first electrode (2; 201) that is provided in an ultrasonic microphone (1a) including a vibration element (3) having a function of performing conversion between mechanical vibration and an electrical signal;

a second electrode (7) that is provided at a position different from the first electrode in an in-plane direction intersecting a directional axis of the ultrasonic microphone; and a detection section (92) that is provided to detect the presence or absence of attached matter (S) attached to the ultrasonic sensor on the basis of a change in capacitance between the first electrode and the second electrode.

In the above configuration, a capacitance is formed between the first electrode and the second electrode. The capacitance is changed according to the presence or absence of attachment of the attached matter attached to the ultrasonic sensor. Thus, on the basis of the change in the capacitance between the first electrode and the second electrode, the presence or absence of attachment of the attached matter can be detected with high accuracy.

What is claimed is:

1. An ultrasonic sensor comprising:
   a first electrode that is provided to an ultrasonic microphone including a vibration element having a function of performing conversion between mechanical vibration and an electrical signal, the vibration element configured to deform due to the mechanical vibration in an axial direction;
   a second electrode that is provided at a position different from the first electrode in an in-plane direction intersecting a directional axis of the ultrasonic microphone, the directional axis being parallel to the axial direction; and
   a detection section that is provided to detect presence or absence of attached matter attached to the ultrasonic sensor on the basis of a change in capacitance between the first electrode and the second electrode, wherein
   in a mounted state in which the ultrasonic sensor is mounted to a body component of an object to which the ultrasonic sensor is mounted, the second electrode is provided to be arranged along the body component in the in-plane direction intersecting the directional axis of the ultrasonic microphone.

2. The ultrasonic sensor according to claim 1, wherein
   the ultrasonic microphone has a diaphragm portion and a diaphragm support portion that is provided to support an outer edge of the diaphragm portion,
   the vibration element is fixedly supported on the diaphragm portion, and
   the first electrode is provided to the diaphragm portion, the diaphragm support portion, or the vibration element.

3. The ultrasonic sensor according to claim 2, wherein
   the first electrode is the diaphragm portion or the diaphragm support portion formed of a conductor, and the first electrode is electrically connected to an electrode layer that configures the vibration element and that is fixedly supported on the diaphragm portion.

4. The ultrasonic sensor according to claim 2, wherein the first electrode is grounded while being electrically insulated from an electrode layer that configures the vibration element and that is fixedly supported on the diaphragm portion.

5. The ultrasonic sensor according to claim 1, wherein the ultrasonic microphone includes:

an element support portion including a diaphragm support portion and a diaphragm portion, the diaphragm support portion having an axial direction in a first direction parallel to the directional axis and being formed in a tubular shape that is opened at an end portion of the diaphragm support portion on a side in the first direction, the diaphragm portion being a plate-shaped portion provided so that an end portion of the diaphragm support portion on a side in a second direction opposite to the first side is closed, the diaphragm portion having an inner surface which is a principal surface on the side in the first direction and an outer surface which is a principal surface on the side in the second direction; and the vibration element that is fixedly supported on the diaphragm portion, the body component is formed in a plate shape and has a mounting hole which is a through hole passing through the body component in the axial direction; and the element support portion is provided so that the diaphragm portion is inserted into the mounting hole and the diaphragm support portion extends from the mounting hole in the first direction.

6. The ultrasonic sensor according to claim 5, wherein the second electrode is provided along the diaphragm support portion.

7. The ultrasonic sensor according to claim 5, further comprising:

an elastic support member that elastically supports the element support portion;

a sensor case that holds the elastic support member; and a mounting member that is configured to hold the ultrasonic sensor to the body component by being fixed to the body component and the sensor case in a mounted state in which the ultrasonic sensor is mounted on the body component, wherein the second electrode is provided to the elastic support member or the mounting member.

8. The ultrasonic sensor according to claim 1, wherein the detection section is provided to detect an attachment position of the attached matter on the basis of a change in capacitance between each of a plurality of the second electrodes and the first electrode.

9. The ultrasonic sensor according to claim 1, wherein the detection section is provided to detect the presence or absence of the attached matter at a timing at which a drive signal that drives the vibration element is not inputted into the vibration element or at a timing at which object detection operation of detecting an object around the ultrasonic sensor on the basis of an output signal from the vibration element is not performed.

10. The ultrasonic sensor according to claim 1, wherein the detection section is provided to detect the presence or absence of the attached matter on the basis of a first impedance change that occurs when a first detection voltage having a first frequency is applied between the first electrode and the second electrode and a second impedance change that occurs when a second detection voltage having a second frequency different from the first frequency is applied between the first electrode and the second electrode.

11. The ultrasonic sensor according to claim 1, further comprising a temperature sensor that is provided to generate an output corresponding to an ambient temperature, wherein the detection section is provided to detect the presence or absence of the attached matter on the basis of the output of the temperature sensor and the change in capacitance.

12. The ultrasonic sensor according to claim 1, wherein the second electrode is positioned external of the ultrasonic microphone.

13. The ultrasonic sensor according to claim 1, wherein the vibration element includes a drive electrode and a reference electrode, and the mechanical vibration in the axial direction of the vibration element generates a voltage between the drive electrode and the reference electrode, which is output as the electrical signal.

* * * * *